United States Patent [19]

Weber

[11] Patent Number: 4,500,593

[45] Date of Patent: Feb. 19, 1985

[54] PROTECTIVE FABRIC AND FIRE CURTAIN WITH A METALLIC LAMINATE

[76] Inventor: John W. Weber, 1929 Gravers Rd., Norristown, Pa. 19401

[21] Appl. No.: 525,328

[22] Filed: Aug. 22, 1983

Related U.S. Application Data

[63] Continuation-in-part of Ser. No. 211,815, Dec. 1, 1980.

[51] Int. Cl.³ .............................................. B32B 7/00
[52] U.S. Cl. .................................. 428/257; 428/246; 428/263; 428/373; 428/377; 428/392; 428/394; 428/457; 428/902; 428/920
[58] Field of Search ............... 428/257, 263, 373, 377, 428/392, 394, 457, 902, 920, 246

[56] References Cited

U.S. PATENT DOCUMENTS

| | | | |
|---|---|---|---|
| 2,132,702 | 10/1938 | Simpson | 117/53 |
| 2,179,087 | 11/1939 | Gibbons | 57/144 |
| 2,230,271 | 2/1941 | Simpson | 19/146 |
| 2,748,019 | 5/1956 | Schramm, Jr. | 117/31 |
| 3,292,991 | 12/1966 | Crawley | 8/115.7 |
| 3,395,527 | 8/1968 | Longley | 57/140 |
| 3,428,278 | 2/1969 | Glaze | 245/8 |
| 3,572,397 | 3/1971 | Austin | 139/426 |
| 3,591,400 | 7/1971 | Palmquist et al. | 117/3.3 |
| 3,729,920 | 5/1973 | Sayers et al. | 57/144 |
| 3,751,897 | 8/1973 | Bailey | 57/144 |
| 3,811,262 | 5/1974 | Clarkson | 57/140 |
| 3,844,195 | 10/1974 | Rhodes et al. | 87/1 |
| 3,913,309 | 10/1975 | Chiarotto | 57/144 |
| 3,952,496 | 4/1976 | Nagel et al. | 57/144 |
| 4,015,038 | 3/1977 | Romanski et al. | 428/255 |
| 4,074,512 | 2/1978 | Matt | 57/140 |
| 4,159,618 | 7/1979 | Sokaris | 57/251 |
| 4,199,635 | 4/1980 | Parker | 428/95 |
| 4,202,382 | 5/1980 | Westhead | 139/383 |
| 4,255,817 | 3/1981 | Heim | 2/2 |
| 4,257,221 | 3/1981 | Feinberg | 57/256 |
| 4,284,682 | 8/1981 | Tschirch et al. | 428/263 |
| 4,302,496 | 11/1981 | Donovan | 428/196 |
| 4,381,639 | 5/1983 | Kress | 57/229 |

OTHER PUBLICATIONS

Technical Center Intercom publication dated Nov. 30, 1982 from the Public Affairs Office, FAA Technical Center, Atlantic City, New Jersey 08045.
Six 3M Bulletins, one undated, unnumbered; K–CF–PB–1(331)NPI; K–MWT–1(33.5)R1; K–MHSF–B–A(331)BE; K–MSTHD–A(331) BE; and K–MB–S–A(331) BE, all related to Nextel Ceramic Fiber and Products.

Primary Examiner—Marion E. McCamish
Attorney, Agent, or Firm—Benasutti and Murray

[57] ABSTRACT

A fire retardant which is suitable for use as a protective material in garments, clothing, fire curtains, barriers or screens is disclosed. The fabric employs an amorphous silica core having a minimum of 96% silica by chemical analysis. The core fiber is encapsulated in a wrapping or covering which may be of polybenzimidazole, aramids, blends of aramids with other fibers and/or polyacrylonitrile fibers or blends thereof. The core fiber and wrapping comprise a heat resistant yarn which may be woven into a heat resistant fabric which may then be aluminized on one or both sides thereof.

20 Claims, 2 Drawing Figures

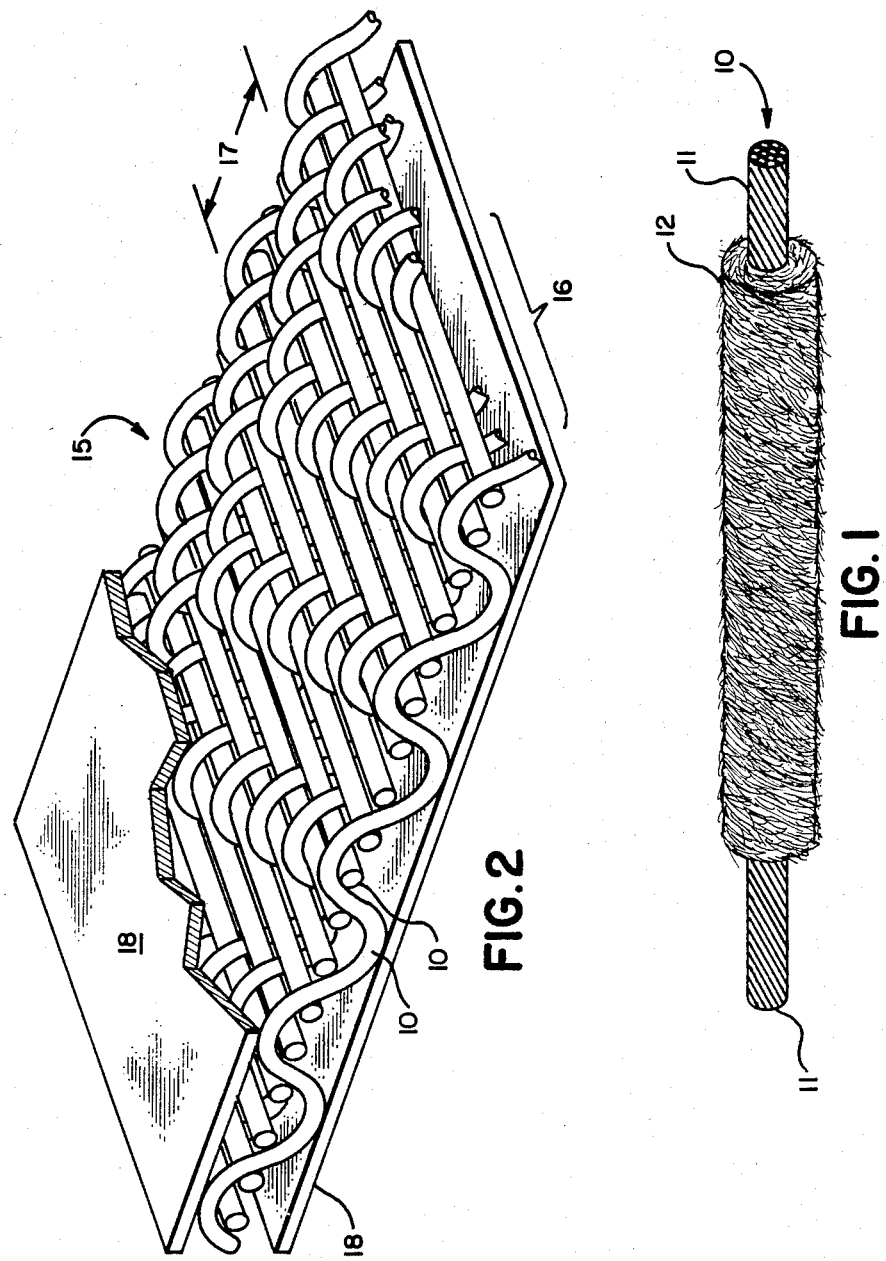

PROTECTIVE FABRIC AND FIRE CURTAIN WITH A METALLIC LAMINATE

CONTINUATION DATA

This application is a continuation-in-part of application Ser. No. 211,815 filed on Dec. 1, 1980.

BACKGROUND OF THE INVENTION

1. Field of the Invention

The present invention relates to heat resistant or protective fabrics for use in high temperature environments. The fabrics are particularly intended for use as fire curtains or barriers to separate personnel from hostile fires.

2. Brief Description of the Prior Art

Initial prior art attempts to produce protective fabrics and fire curtains concentrated on the use of asbestos yarns or blends of asbestos fibers and other natural or synthetic fibers in blended yarns. Later efforts to produce protective fabrics centered on the possibility of using glass fibers or blends of glass fibers and other fibers to produce yarns for this purpose.

SUMMARY OF THE INVENTION

The present invention provides a fabric which is suitable for use as a protective material in garments, clothing and fire curtains, barriers or screens. More particularly, the present invention provides a fabric which has been useful in resisting high temperature fires such as those fueled by the ignition of aviation or jet fuel.

In accordance with the invention there is taught a composite yarn and a fabric made therefrom which are useful at elevated temperatures and are resistant to thermal shock. The composite yarn is formed of a central core of low abrasion resistance but high temperature resistant material surrounded by a sheath, covering or wrapping of a second high temperature resistant material which has better abrasion resistance than the central core.

In general, the core wil be proportionally present in amounts between 20-70% by weight.

It is an object of the present invention to provide a fabric which is suitable as a blocking material or curtain which is resistant to high temperatures and to direct application of flames.

It is an object of the invention to provide a yarn suitable for making the protective fabric.

It is an object of the invention to provide a fabric which is suitable for use as a blocking curtain in the cabin or cabin exit of an aircraft.

BRIEF DESCRIPTION OF THE DRAWINGS

FIG. 1 is an illustrative view of a core yarn according to the invention; and

FIG. 2 is an illustrative view of a woven fabric incorporating the yarn of FIG. 1.

DESCRIPTION OF THE PREFERRED EMBODIMENTS

The description of the preferred embodiments will be set forth hereinafter with reference to FIGS. 1 and 2, like numerals refer to like items in both views.

Referring now to FIG. 1, there is shown a yarn 10 which is comprised of a core filament 11 and wrapping or cover 12. The manufacturing of a core yarn 10 which is comprised of a core filament 11 covered or sheathed by a wrapping of textile fibers 12 is well known in the art.

The following is a description of one of the processes which are acceptable for producing the yarn 10.

One method of producing yarn in accordance with the invention is the use of the open-end machine system Dref-II manufactured by Dr. Ernst Fehrer of Australia. In the "DREF-II" open-end spinning system, a card sliver is fed to the spinning station, the sliver in turn gets opened into single fibers by a rapidly rotating card drum. These airborne fibers are then deposited upon the external peripheral surface of the drum, and are in turn stripped off by the cetrifugal force of the rapidly rotating card-drum, and are supported by an air-jet which blows the fiber flux into the nip of a pair of perforated rotating spinning drums. The fibers are twisted around the core yarn by a mechanical rolling-off process, supported by the aspiration of the air current through the perforated spinning drums and are formed into yarn which is drawn away by a pair of delivery rollers and is wound on cross-bobbins.

In order to further explain the spinning process on the preferred system, the system may be divided into four steps; of feeding or inlet aggregate; opening aggregate; spinning aggregate; and winding aggregate or outlet aggregate.

The feeding or inlet aggregate consists of three pairs of inlet rollers which are geared with each other. Carded slivers are fed into these rollers which provide the necessary draft to the slivers and transport it to the opening zone.

The opening aggregate consists of a stationary rotor and a rotating stator or card-drum having interlocked saw tooth wire clothing. The drafted band of sliver is fed to the rapidly rotating card-drum which opens it to single fibers. The fibers are then carried over on to the toothed peripheral surface of the rapidly rotating card-drum, until the centrifugal force strips off the fibers. At the point where the fibers start stripping off the drum surface, the air currrent is provided to blow the fibers into the nip of two perforated spinning drums. Thus, the fibers are now brought to spinning zone.

The spinning aggregate, comprises a pair of perforated spinning drums, a pair of suction inserts, a pair of outlet rollers and a pillow block. The perforated spinning drums are made to rotate in the same direction. When the flux of fibers is blown to the nip of the pair of these spinning rollers, the fibers are twisted around the core yarn by a mechanical rolling-off process, which is supported by the aspiration of the air current through the perforated spinning drums. The necessary air currrent into the spinning drums is provided by suction inserts in the spinning drums. The twisted fibers or formed yarn is drawn away from the spinning zone by a pair of outlet rollers at a desired speed. The yarn then procedes to the winding zone.

The winding aggregate consist of a grooved roller and a bobbin frame. The outlet rollers and the grooved rollers are driven by the same motor. The bobbin frame holds a bobbin (or tube) between its two ends and presses it against the grooved roller. After the yarn is drawn away by a nip of the rotating pair of outlet rollers it passes through the grooved space and is wound on the bobbin by the surface friction between the grooved roller and the bobbin. After the required size bobbin is wound that spinning station stops the operator doffs off that bobbin and starts another.

Yarn formed on this system is commonly called core spun yarn since it has a core in the center of the yarn. This core-spun yarn is a single yarn which subsequently is plied and converted into a fabric of a desired weight and style. The material denier is such that the core vs. wrapping is approximately 70/30. Yarns produced by the DREF-II system are preferred because this system produces a yarn having approximately a 100% wrapping cover.

A second method of producing the yarn is utilizing a Saco-Lowell spinning frame where a roving of textile fibers is fed to the spinning position to which is added a filament core at the last drafting roll. The fibers of the roving wrap about the filament core with a true twist applied by a spinning ring.

In the preferred embodiments, the core filament 11 is an amorphous silica product, which is available under the tradename Refrasil. Refrasil filaments are available from the Hitco Materials Group, and Armco Company of Armco, Inc., Middletown, Ohio.

This core filament is a generally fragile material with low abrasion resistance but it does have a high temperature resistance on the order of 2000° F. and a thermal shock resistance on the order of 2800° F. The size of the filament may be varied. One suitable filament was 1350 denier with a twist on the order of four turns per inch.

Engineering data available from the Hitco Materials Group indicates that Refrasil textiles for industrial installations are continuous filament, amorphous silica with the thermal performance of a refractory material. Standard Refrasil material is caramel in color while preshrunk forms are white in color. The Refrasil filament contains a minimum of 96% silica with a typical chemical analysis showing the constituent and percentages as noted.

| | | | |
|---|---|---|---|
| $SiO_2$ | 97.9 | $Fe_2O_3$ | 0.017 |
| $TiO_2$ | 0.55 | $ZrO_2$ | 0.017 |
| $Al_2O_3$ | 0.29 | $SrO$ | 0.021 |
| $MgO$ | 0.013 | $CuO$ | trace |
| $B_2O_3$ | 0.41 | $NiO$ | trace |
| $CaO$ | 0.71 | $Cr_2O_3$ | trace |

The engineering data available from Hitco further indicates that Refrasil filament will not melt or vaporize until temperatures exceed 3100° F. (1704° C.), the material will insulate continuously and retain its strength and flexibility to 1800° F. (982° C.). Beyond this temperature some embrittlement and shrinkage occurs, but the material continues to provide thermal protection to 3100° F. (1704° C.).

Still with reference to FIG. 1, the composition of the wrapping or covering 12 will be selected in accordance with the eventual application and environment for the final fabric. Thus, in applications where the integrity of the fabric after exposure is not critical, or the temperature of the exposure does not approach 1800° F. (982° C.), the wrapping or covering 12 may be of Kevlar, available from E. I. Du Pont De Nemours and Company, Wilmington, DE. The wrapping or covering 12 may also be of a blend of aramids, or of aramids blended with other fibers. One suitable blend may consist of Kevlar, Nomex and Kynol with varying percentages of each. Nomex is the tradename of an aramid fiber available from Du Pont and Company and Kynol is the tradename of phenolic fibers available from Nippon Kynol Corporation of Japan and is available in the United States from American Kynol, Inc. of New Yok, N.Y. Another suitable wrapping fiber is non-melting, heat stabilizing or carbonized polyacrylonitrile fibers, available under the tradename Celiox, from Celanese Plastics and Specialties Company, Charolette, N.C. Additionally, for certain applications the wrapping or covering 12 may be comprised of heat resistant fibers such as polybenzimidazole, known as P.B.I. fibers available from Celanese Corporation of Charolette, N.C.

With respect to those fabrics which must maintained their integrity after exposure to temperatures at which the Refrasil filament begins to exhibit some embrittlement and shrinkage, it has been found that a wrapping or covering 12 of P.B.I. fibers produces a yarn and fabric which will withstand the additional temperatures and maintain its integrity. It is not known how the P.B.I. fibers are combining with the Refrasil filament or core to produce this result, however, it is believed that this result is due somewhat to the ability of the P.B.I. fibers to resist shrinkage. For instance, it is known that the aramid fiber blends will at these high temperatures undergo some shrinkage and decomposition. It is believed that as a result of this shrinkage of the aramid fiber blend additional stress may be placed on the embrittled Refrasil filament and the integrity of the fabric may be lost. The increased temperature resistance of the Refrasil filament may be due to the thermal shock absorbing quality of the P.B.I. fibers. In addition to the use of P.B.I. wrapping or covering with the Refrasil filament, it has been found that an excellent blocking material or fire screen for use in an aircraft cabin situation may be produced by using a herringbone weave pattern.

As a result of a suggestion by the Airline Pilots Association, in the final report of the Special Aviation Fire and Explosion Reduction Committee, studies have been conducted to identify materials which are usable as curtains, barriers or screens to block radiant heat and flames from entering the cabin or interior of an aircraft in the event of a fuel fire outside of the craft or cabin. It is easily appreciated, that uncontrolled fires in an aircraft during flight are extremely hazardous both as to crash potential and the potential for generating toxic fumes or suffocating gases. Likewise, it is easily appreciated that fuel fires subsequent to an aircraft crash or emergency landing present an extreme and real danger to the occupants of the craft and may hinder evacuation of the craft. It is generally believed that all occupants of a craft should evacuate the cabin within ninety seconds of the time the craft has crashed or made its emergency landing. Therefore, one of the critical parameters required of the blocking material or blocking curtain is the ability to withstand extreme heat and flame during the evacuation period.

The test fixture was a section of an actual aircraft cabin which was permanently located beside a fuel pit of approximately 20 feet by 20 feet. Jet fuel was placed in the pit and ignited to simulate an actual fire condition. The material to be tested was secured in the doorway or cabin exit and generally secured to the cabin contour so as to prevent heat or flames from entering the cabin. Thermal sensors were positioned in the cabin to record differences between interior and exterior temperatures.

During the testing of materials to determine the required parameters for a blocking material or fire curtain suitable for use in an aircraft, it was determined that the ideal material in addition to possessing the required heat resistance, must possess sufficient strength to maintain its intregrity after fire exposure; it should generate a minimum off gassing and interstice fires and it should have minimum shrinkage to achieve maximum dimensional stability. The need for past exposure integrity recognized the potential use of the invention under various wind conditions. If the fabric failed under wind conditions, the essential purpose of the material would be voided. Under zero wind conditions, the integrity of post exposure materials may not be as critical. The problems generated by off gassing have been generally recognized by researchers, however, to date accurate identification and measurement of off gassing has not been possible. Likewise, it has been recognized that certain weaves or structures will support vapor fires in the interstices of the weaves. However, while researchers have recognized the existance of these vapor fires, they still have not assessed the full meaning of the fires. Researchers generally believe that elimination of off gasing and vapor fires is both beneficial and an indicator of a good blocking material.

At the FAA Technical Center, Atlantic City Airport, N.J. 08405, tests were conducted on various fire blocking materials to determine their feasibility as blocking curtains to prevent radiant heat and flows from entering the cabin interior in the event of a fuel fire outide the aircraft. The fabric used for this test, and the only fabric which proved acceptable in these tests, was a fabric according to the invention.

The successful fabric was woven in a herringbone pattern from yarns 10 having a Refrasil filament 11 and a P.B.I. wrapping or covering 12. The Refrasil core comprised 53.6% of the fabric weight and the P.B.I. fibers comprised 46.4% of the fabric weight. The fabric weighed approximately 28 ounces per square yard, had approximately 24 ends per inch and approximately 13 picks per inch. The fabric was woven with 100% warp and pick fill and a theoretical cover factor of 0.92 with 1 being the theoretical maximum. The test fabric also had a metallic lamination on both sides thereof. The metallic laminate was of aluminum foil and was applied by vacuum application. The application of a metallic laminate to fabrics is known to those skilled in the art.

With reference to FIG. 2, the fabric 15 is woven in a herringbone repeat pattern with yarns 10 in both the warp direction 16 and the filling direction 17. The metallic laminate is illustrated at 18.

In the actual test conducted at the Technical Center, the value of the metallic laminate was not assessable. It was found that the extremely high temperatures caused carbonation or evaporation of the aluminum foil and therefore the beneficial value of the aluminum could not be determined. However, it was determined that the application of aluminum foil to fabrics which were previously unacceptable did not make those fabrics acceptable. In fact, the test data indicate that the metallic lamination is not critical to the blocking process of the fabric or its success. However, the researchers did theorize that the metallic laminate may be beneficial in blocking initial gassing and in preventing some of the pore fires which are created by the vapors locked in the interstices of the weaves. In summary, there is nothing to indicate that the metallic laminate is critical to the performance of the fabric. It is believed that the aluminum, if it has any affect, would be affective at the lower temperatures of exposure and therefore, do not appear to be critical to the high temperature characteristics of the fabric.

During the above referenced testing, it was also discovered that fabric woven of composite yarns having a glass filament as distinguished from a "Refrasil" filament, with a cover or wrapping of polybenzinidazole were unsatisfactory. This was true for fabrics with or without metallic laminates. It will be recognized that glass fibers are generally considered to be those fibers, such as fiberglass, which are exclusive of fused or leached silica fibers.

During testing, the researchers determined that excess radiation or radiant heat can cause non-flamable materials within the craft to become flamable. Furthermore, the researchers found that the successful material was able to cut the radiant heat by as much as 750% and thereby reduce the risk of cabin fires as a result of radiant heat. Likewise, the researchers determined that vapor fires in the interstices of the weave, while not desirable, do not present the same problems generated by radiation and therefore these interstices vapor fires do not create the hazard of later cabin fires.

In order to test the effectiveness of the barrier material or curtain in high wind conditions where the curtain was not secured against the contour of the cabin, the curtain was permitted to hang free and flap in the wind. In one such test conducted for 78 seconds, the ceiling temperature of the cabin increased to 736° F. However, with the curtain in place, the ceiling temperature did not exceed 200° F. Thus, it can be seen that the fabric of the invention prevents the ingress of radiant heat into the cabin which would create a non-survivable thermal condition as a result of the heat generated by the fire. Without this thermal blocking ability, it may not be possible to prevent the actual flames from entering the cabin and the loss of life due to the severe thermal conditions within the cabin.

What is claimed is:

1. A high temperature resistant fabric comprised of yarns, having a core of high temperature resistant refractory material silica and covering of a second high temperature resistant fiber selected from the group consisting essentially of aramid, phenolic, polyacrylonitrile and polybenzimidazole fibers, and a metallic laminate.

2. The fabric of claim 1 wherein:
said second fiber has greater abrasion resistance than said core and comprises at least 45% by weight.

3. The fabric of claim 1 wherein:
said fabric is woven in a herringbone repeat pattern and has a maximum theoretical cover factor of 1.

4. The fabric of claim 1 wherein:
said fabric is woven in a herringbone repeat pattern and has a theoretical cover factor of 0.92%.

5. The fabric of claim 4 wherein:
said core is proportionally greater than 50% by weight.

6. The fabric of claim 4 wherein:
said core is proportionally greater than 53% by weight.

7. A high temperature resistant fabric comprised of composite yarns, each yarn further comprised essentially of a core of high temperature silica having the thermal performance of refractory material and a covering of polybenzimidazole, and a metallic laminate.

8. The fabric of claim 7 wherein:
said core is at least 96% silica.

9. The fabric of claim 7 wherein:
said core is at least 97% silica.

10. The fabric of claim 7 wherein:
said core is at least 97.9% silica.

11. The fabric of claim 7 wherein:
said core is proportionally greater than 50% by weight.

12. The fabric of claim 7 wherein:
said core is proportionally greater than 53% by weight.

13. The fabric of claim 12 wherein:
said fabric is woven in a herringbone repeat pattern.

14. The fabric of claim 12 wherein:
said fabric is woven with a maximum theoretical cover factor of 1.

15. The fabric of claim 12 wherein:
said fabric is woven with a theoretical cover factor of 0.92%.

16. The fabric of claim 15 wherein:
said fabric further comprises a herringbone repeat pattern.

17. A high temperature resistant fabric having structural integrity above 1800° F., said fabric comprised of:
interwoven yarns, each of which is comprised essentially of a core filament of high temperature silica having the thermal performance of a refractory material, and a covering of polybenzimidazole sheating said core, and a metallic laminate.

18. The fabric of claim 17 wherein:
said core is proportionally greater than 50% by weight.

19. The fabric of claim 18 wherein:
said fabric is woven in a herringbone repeat pattern.

20. The fabric of claim 19 wherein:
said fabric is woven with a calculated cover factor of 0.92%.

* * * * *